United States Patent
Ito et al.

(10) Patent No.: US 7,268,967 B2
(45) Date of Patent: Sep. 11, 2007

(54) LINEAR-TYPE TAPE STORAGE MAGNETIC HEAD DEVICE

(75) Inventors: Tsutomu Ito, Miyagi (JP); Yoshihiko Ito, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/005,264

(22) Filed: Dec. 6, 2004

(65) Prior Publication Data

US 2005/0190485 A1 Sep. 1, 2005

(30) Foreign Application Priority Data

Dec. 10, 2003 (JP) .............................. 2003-412281

(51) Int. Cl.
*G11B 21/02* (2006.01)
(52) U.S. Cl. ...................................................... 360/75
(58) Field of Classification Search .................. 360/75, 360/25, 77.12; 365/120; 73/1.79
See application file for complete search history.

(56) References Cited

U.S. PATENT DOCUMENTS

| | | | | |
|---|---|---|---|---|
| 3,737,877 | A * | 6/1973 | Feinleib ..................... | 365/120 |
| 4,516,162 | A * | 5/1985 | West ........................... | 360/25 |
| 4,918,972 | A * | 4/1990 | Kenny et al. ................. | 73/1.79 |
| 5,675,448 | A * | 10/1997 | Molstad et al. ............. | 360/77.12 |
| 6,587,303 | B1 | 7/2003 | Bui et al. | |
| 6,614,607 | B1 * | 9/2003 | Rothermel et al. ........... | 360/48 |
| 6,963,467 | B2 * | 11/2005 | Bui et al. ..................... | 360/77.12 |
| 6,992,847 | B1 * | 1/2006 | Clemons et al. ............. | 360/74.1 |
| 7,061,712 | B2 * | 6/2006 | Harper et al. ............. | 360/77.12 |
| 2005/0168864 | A1 * | 8/2005 | Knowles et al. ......... | 360/77.12 |
| 2005/0168865 | A1 * | 8/2005 | Simmons et al. ........ | 360/77.12 |

FOREIGN PATENT DOCUMENTS

| | | |
|---|---|---|
| JP | 62-209948 | 9/1987 |
| JP | 01-214274 | 8/1989 |
| JP | 02-185752 | 7/1990 |
| JP | 05-021319 | 1/1993 |
| JP | 10-064031 | 3/1998 |
| JP | 11-242864 | 9/1999 |
| JP | 2001-210034 | 8/2001 |
| JP | 2002-015532 | 1/2002 |
| JP | 2003-173508 | 6/2003 |

\* cited by examiner

*Primary Examiner*—Fred F. Tzeng
(74) *Attorney, Agent, or Firm*—Robert J. Depke; Rockey, Depke & Lyons, LLC.

(57) ABSTRACT

A linear-type tape storage magnetic head device in which track density and the response of a magnetic head is improved is provided. A sliding portion constituting a main sliding surface in contact with a magnetic tape T and a magnetic head element chip portion. A tracking mechanism has a two-stage tracking mechanism of a rough-move tracking mechanism and a fine-move tracking mechanism, with the magnetic head element chip pardon being directly disposed in the fine-move tracking mechanism and the fine-move tracking mechanism being disposed in the rough-move tracking mechanism; the rough-move tracking mechanism makes the magnetic head element chip portion move across the tracks arranged in parallel in the width direction of the magnetic tape T; and the magnetic head element chip portion made lighter in weight provides improved speed-up and accuracy of tracking and high density of the tracks can be obtained.

9 Claims, 5 Drawing Sheets

LINEAR-TYPE TAPE STORAGE MAGNETIC HEAD DEVICE

BACKGROUND OF THE INVENTION

1. Field of the Invention

The present invention relates to a linear-type tape storage magnetic head device which is used for a data backup, for example, on the computer and in which a magnetic tape is used as a medium.

2. Description of the Related Art

Of late, with a trend for a large capacity of the hard disc, the amount of data to be dealt with by a computer system has increased enormously. On that account, there is a growing demand for a data storage system using a magnetic tape as a backup device.

Currently, as the data storage system using the magnetic tape, there are a helical system type using a rotating head and a linear system type using a fixed head. Most formats of the linear system type employ a servo mechanism in accordance with a servo-band system (refer to patent document 1, for example).

Figure 1:
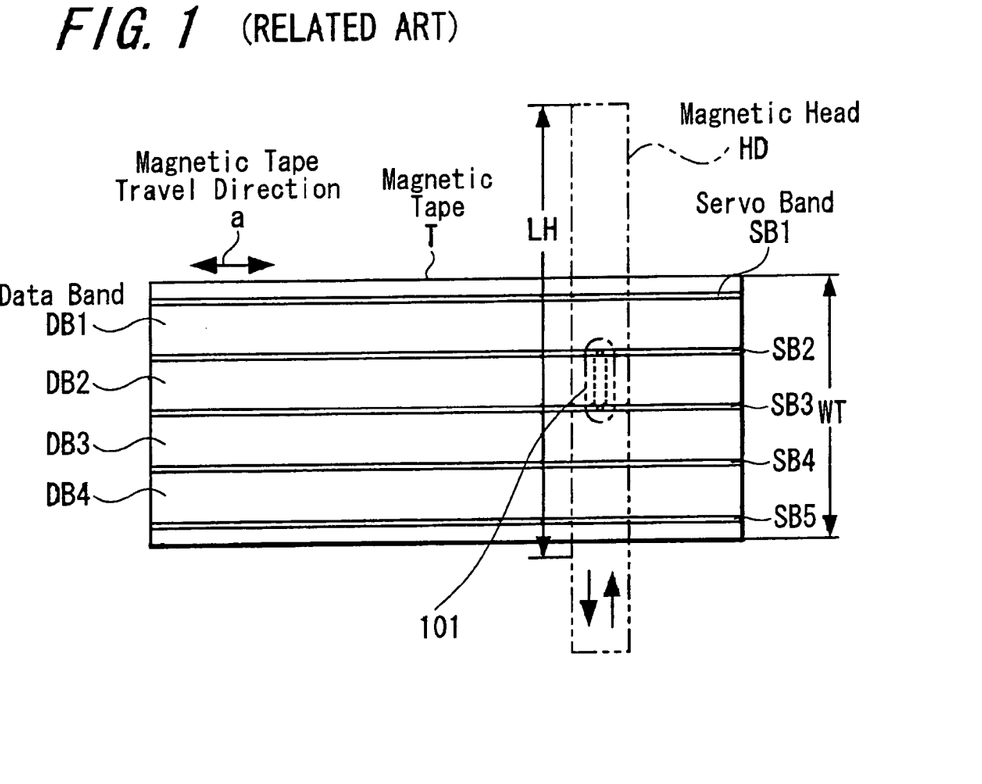
FIG. 1 is a schematic plan view showing a data format for linear type tape data storage, for explaining a linear-type tape storage magnetic head device of the present invention and of conventionally provided.

FIG. 1 schematically shows a format of the linear system type. The illustration shows a state in which the overall width of a magnetic tape T includes four data bands DB (DB1, DB2, DB3, and DB4) separated by five servo bands SB (SB1, SB2, SB3, SB4, and SB5).

Figure 2:
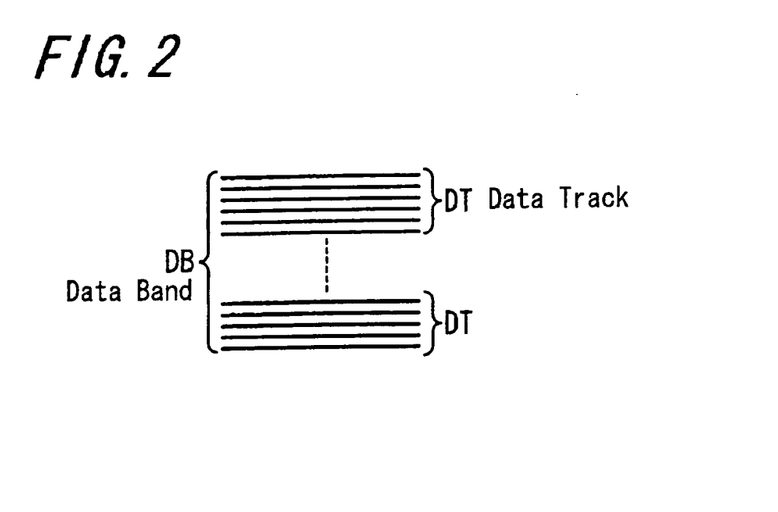
FIG. 2 is an explanatory view of a data track of the data format shown in FIG. 1.

In addition, each of the data bands DB includes data tracks DT constituting a plurality of, for example, 96 pieces of channels as schematically shown in FIG. 2. The data track DT becomes a minimum unit for writing and reading (reproducing) data.

On the other hand, as shown with a broken line in FIG. 1, conventionally a recording and reproducing head HD has a length two times as long as a tape width WT and a magnetic head element portion 101 is provided in the middle portion.

Figure 3:
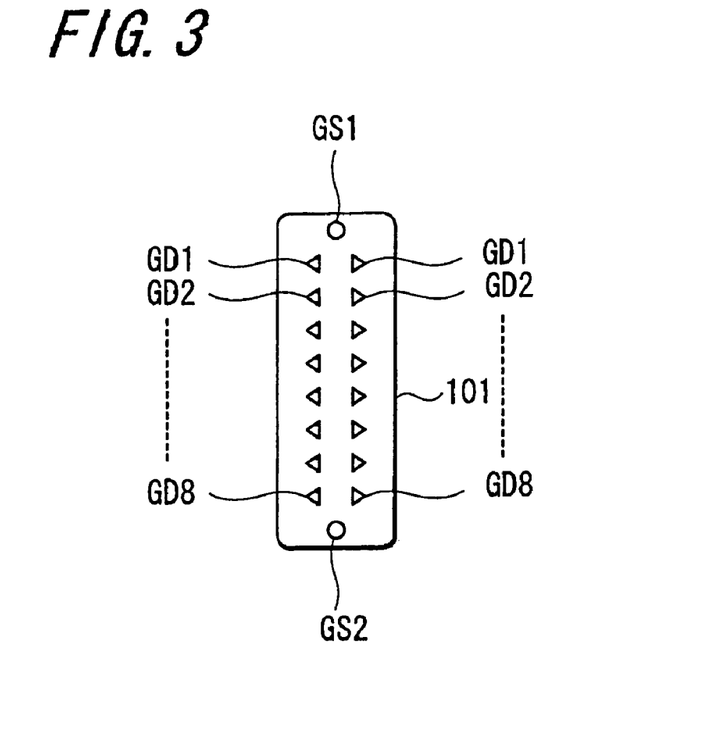
FIG. 3 is a schematic front view of a magnetic head element portion of a conventional linear-type tape storage magnetic head device.

The magnetic head element portion 101 includes, as shown in FIG. 3, a servo signal reproducing magnetic head elements GS (GS1 and GS2) for reading a servo signal written in each of two adjacent servo bands SB with each data band DB in between, and between them, corresponding to a plurality of data tracks DT of the data bands DB, pairs of data recording and reproducing magnetic head elements GD (GD1, GD1, GD2, GD2 . . . and GD8, GD8) arranged respectively maintaining required intervals in the longitudinal direction of the magnetic tape, which serve not only as data recording magnetic head elements for writing a data signal but also as a data reproducing magnetic head element for reading data signals.

In the case of the linear system type, a tape T, as shown by an arrow a in FIG. 1, travels bi-directionally, and in the respective data bands DB, for example, the magnetic head elements GD perform recording and reproducing as moving to and fro twelve times over a predetermined selected set of, for example, eight channels.

The recording and reproducing are performed with respect to the respective channels, that is, data tracks DT by the eight pairs of the data recording and reproducing magnetic head elements GD formed to respectively maintain required intervals in the extending directions of the tracks; and at a time of recording data, with a to-and-fro movement of a tape, one of the pair operates as a recording magnetic head element, and the other operates as a reproducing magnetic head element for monitoring the state of recording in respective pairs.

Then, at a time of reproducing data, reproduction is performed by one of the pair of the recording and reproducing magnetic head elements GD in respective pairs.

Further, in those recording and reproduction of data, tracking servo is performed by a servo signal obtained by the servo signal reproducing magnetic head elements GS1 and GS2.

Figure 4:
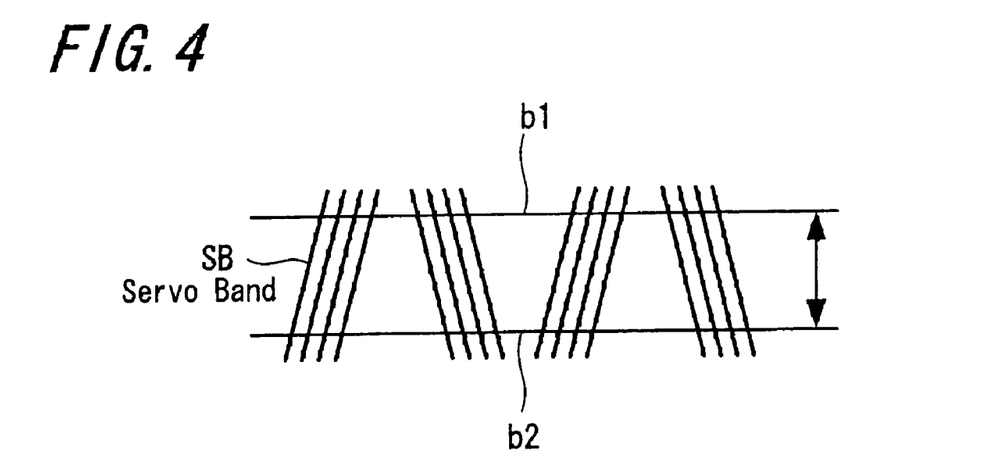
FIG. 4 is a pattern diagram of a servo signal in a servo band.

With respect to the servo signal recorded in the servo band, as shown for example with a recording pattern thereof in FIG. 4, what is called a Chevron structure, that is, a servo system based on a recording format by the servo signal of an angled pattern can be employed.

In addition, when performing, for example, the twelve times to-and-fro recording or reproducing in a target data band DB, at servo bands positioned on the both sides of the data band DB, as shown in FIG. 4, the pair of the servo signal reproducing magnetic head elements GS sequentially moves in the width direction of the servo band SB between lines b1 and b2 that traverse a servo signal in FIG. 4 to obtain servo signals that have different signal intervals corresponding to a position moved, and as a result, the position of the magnetic head element portion 101 can be detected, making it possible to perform position control, that is, the tracking servo. [Patent Document 1] Japanese Published Patent Application 2000-48431 Hereupon, the capacity per tape cartridge of current data storage is approximately 200 MB.

Meanwhile, as mentioned above, since the capacity of the hard disc becomes larger and a high-speed operation has come to be required of the computer, data to be dealt with has increased rapidly. As a result, demand is growing for a large capacity of the tape storage device.

In addition, in order to attain this large capacity, it is necessary to improve linear recoding density as well as track density.

The track density of a tape storage system commercially available is 1k to 2k TPI (Track Per Inch); however, in order to obtain 2 to 4 times larger capacity, the track density of 2k to 5k TPI or more is demanded.

With the servo system currently provided, however, 2k TPI or so is considered to be the limit.

This limit is ascribable mainly to high-speed and precision of the movement due to the large mass of a mechanically movable portion in the servo system.

That is to say, with respect to the magnetic head HD for the linear system, a magnetic gap portion of the magnetic head element needs to be brought in contact with the tape uniformly. Further, the magnetic gap portion needs a fine contact with the tape to smoothly move between the data bands to obtain a uniform sliding condition. Therefore, as described above, the length LH of the magnetic head HD is selected to be two times the tape width WT.

As a result, the magnetic head HD becomes large in terms of size and mass thereof.

In addition, a drive system such as VCM (Voice Coil Motor) or the like is used to track a data track targeted by the magnetic head; however, in order to move a large-size and heavy magnetic head, large power is needed, as mentioned above.

Accordingly, a VCM having a large drive power becomes necessary, with the result that the mechanically movable portion of the servo system including the magnetic head becomes furthermore large. As a result, the drivable range of the VCM is limited to a large extent and a servo range is lowered to several 100 Hz and a TPI to be obtained becomes 2k TPI or so.

On the other hand, expectations are high for reducing back-up time by speeding up the tape traveling time so that data-transfer speed can be improved. The tape speed of the current typical system is more or less 5 m/s, and the speed of 10 m/s to 20 m/s or so is expected in the future. Such speeding up of the tape traveling time requires the servo to accelerate data tracking. That is because the components of high frequency in the frequency of the tape oscillation become larger in proportion to the tape speed.

Accordingly, a tracking system with a favorable response is demanded for obtaining a high density of tracks and for speeding up a transfer time.

The present invention is to provide a linear-type tape storage magnetic head device, in which the track density and the response of the magnetic head are improved by solving the above problems.

SUMMARY OF THE INVENTION

The linear-type tape storage magnetic head device according to the present invention is a magnetic head device for linear-type magnetic tape storage, including a tracking mechanism, in which a magnetic head portion includes a sliding portion that constitutes a main sliding surface in contact with the magnetic tape and a magnetic head element chip portion including a servo signal reproducing magnetic head element for reading the servo signal, a data recording magnetic head element for writing data and a data reproducing magnetic head element for reading data; the tracking mechanism has a two-stage tracking mechanism including a rough-move tracking mechanism and a fine-move tracking mechanism; the magnetic head element chip portion is disposed directly in the fine-move tracking mechanism; the fine-move tracking mechanism is disposed in the rough-move tracking mechanism; and the rough-move tracking mechanism moves the magnetic head element chip portion across the overall width of a portion where all tracks are formed and arranged in parallel in the width direction of the magnetic tape.

Further, in the above linear-type tape storage magnetic head device of the present invention, the fine-move tracking mechanism is configured to be driven by a servo signal recorded on the magnetic tape from the servo signal reproducing magnetic head element and makes the magnetic head chip portion fine-move in the width direction of the magnetic tape to perform a high-speed tracking, and the rough-move tracking mechanism is configured to select a required track.

Further, in the above linear-type tape storage magnetic head device of the present invention, the fine-move tracking mechanism has 500 Hz or more resonance frequencies.

Further, in the above linear-type tape storage magnetic head device of the present invention, the fine-move tracking mechanism is formed of a bimorph element including a pair of piezoelectric ceramic boards, applies a voltage corresponding to a servo signal from the servo signal reproducing magnetic head element to the bimorph element, and makes the magnetic head element chip portion fine-move in the width direction of the magnetic tape to operate a high-speed tracking.

Furthermore, in the above linear-type tape storage magnetic head device of the present invention, a magnetic tape traveling guide block that constitutes a sliding portion in contact with the magnetic tape is provided, an opening is formed in a sliding surface, in contact with the magnetic tape, of the magnetic tape traveling guide block, the magnetic head element chip portion is disposed in the rear portion of the magnetic tape traveling guide block with a magnetic gap facing the sliding surface through the opening, and movement of the magnetic head element chip portion by at least the fine-move tracking mechanism is performed inside the opening.

In the linear-type tape storage magnetic head device according to the configuration of the present invention, the tracking mechanism has a two-stage tracking mechanism including a fine-move tracking mechanism and a rough-move tracking mechanism; the magnetic head portion is formed of a sliding portion and a magnetic head element chip portion; and tracking selection is performed such that the rough-move tracking mechanism roughly adjusts the magnetic head chip, for example, together with the sliding portion, each of the magnetic head elements for recording and reproducing data is brought to a required data track of a required data band, and the servo signal reproducing magnetic head element is brought to the servo bands corresponding to the data band.

Further, in the state of the tracks having been selected, the tracking servo driving of the respective data recording and reproducing magnetic head is performed with a servo signal read out from servo bands by the servo signal reproducing magnetic head, by driving the fine-move tracking mechanism to perform a fine-move control using a servo signal, in which only the magnetic head element chip is read out from a data track by the servo signal reproducing magnetic head.

As described above, in the linear-type tape storage magnetic head device of the present invention, since the selection of tracks is performed by the rough-move tracking mechanism and the fine-move adjustment of tracking servo is performed on a light weight portion including only the magnetic head elements and a chip by the fine-move mechanism so that the tracking servo can be performed. only on the light weight portion of the magnetic head element chip portion, a mechanical load on the fine-move mechanism can be extremely reduced compared with conventional devices.

As a result, the tracking and high-speed operation by the servo signal are improved, making it possible to perform a high-speed tracking as well as accurate tracking.

Further, since the tracking accuracy is improved in this manner, a track density and recording density can be improved.

In addition, with such configuration, when compared with a conventional configuration as described above, in which the resonance frequency of the head was approximately 100 Hz or so, it is possible to improve the resonance frequency up to 500 Hz or more, for example, several k Hz or more. As a result, the response to the frequency of the tracking head can be broadened.

DESCRIPTION OF THE PREFERRED EMBODIMENTS

Embodiments of the present invention will be explained. By referring to drawings, the embodiments of the present invention will be explained. However, the present invention is not limited to those embodiments.

A linear-type tape storage magnetic head device according to the present invention is the magnetic head device in which, as explained in, for example, FIGS. 1 to 4, recording and reproducing are performed on a magnetic tape T with a plurality of servo bands SB and data bands DB alternately disposed in the width direction of the tape. The recording and reproducing are performed on respective data tracks DT in the respective data bands DB by a servo signal recorded on the servo bands SB disposed on the both sides of the respective data bands DB.

Figure 5:
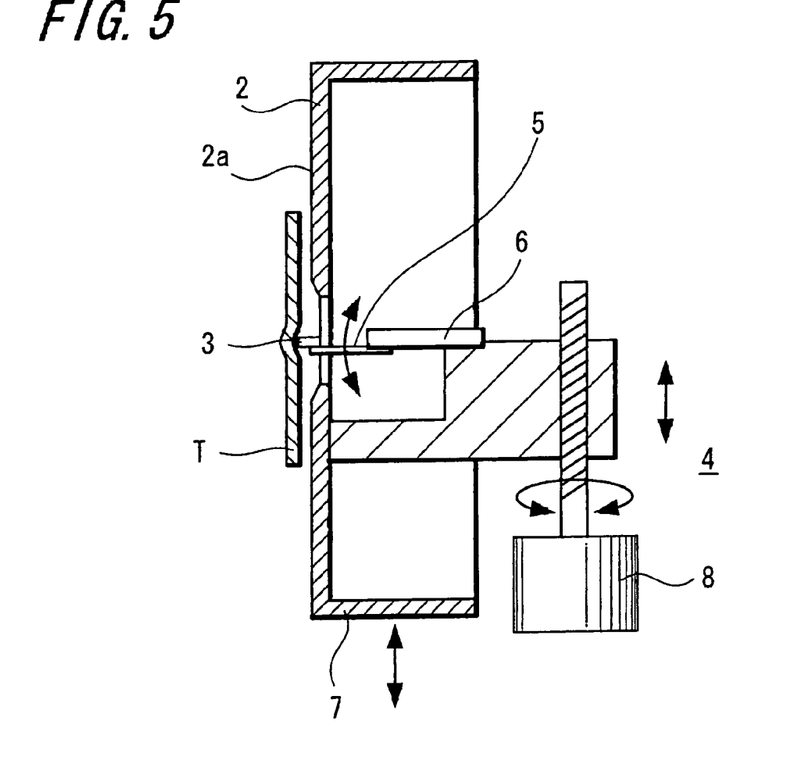
FIG. 5 is a schematic sectional view of an example of a linear-type tape storage magnetic head device according to the present invention.

The linear-type tape storage magnetic head device according to the present invention, as shown in an example of a schematic constitutional diagram of FIG. 5, separately includes a sliding portion 2 constituting a main sliding surface 2S in contact with the magnetic tape T and having a required width, area and shape for stably sliding the tape T, which crosses in the orthogonal direction of the space in FIG. 5, on the operational portion of the magnetic head, and a magnetic head element chip portion 3 including a servo signal reading magnetic head element (namely, servo signal reproducing magnetic head element), data writing magnetic head element (namely, data signal recording magnetic head element), data reading magnetic head element (namely, data signal reproducing magnetic head element).

Further, as a tracking mechanism, the linear-type tape storage magnetic head device has a two-stage tracking configuration including a rough-move tracking mechanism 4 and a fine-move tracking mechanism 5.

The magnetic head element chip portion 3 is directly disposed in the fine-move tracking mechanism 5, and the fine-move tracking mechanism 5 is disposed to connect to the rough-move tracking mechanism 4.

The rough-move tracking mechanism 4 is configured to make the magnetic head element chip portion 3 move across the overall width of the portion where all the data bands DB and servo bands SB are arranged in parallel in the width direction of the magnetic tape.

Figure 6:
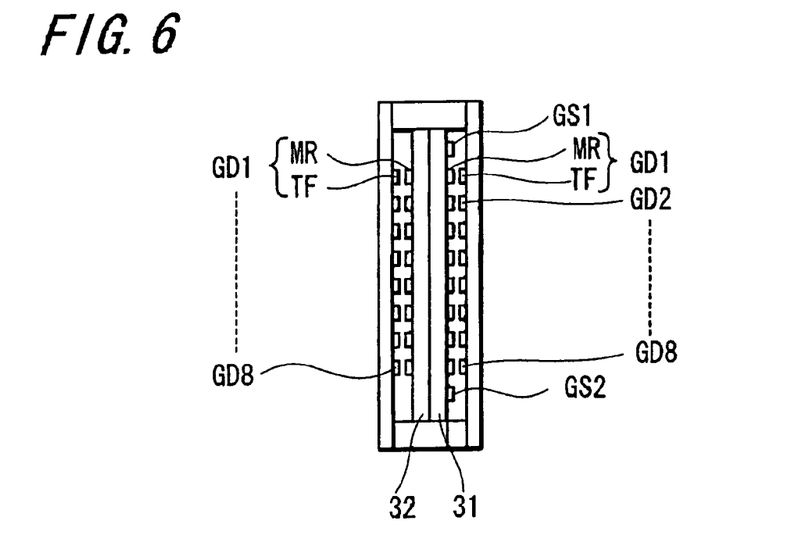
FIG. 6 is a front view of an example of a magnetic head element chip portion of the linear-type tape storage magnetic head device according to the present invention.

The magnetic head element chip portion 3, as shown in an example of the front view of FIG. 6, can be configured such that magnetic head elements are respectively arranged on thin plate-shaped head substrates 31 and 32 made of, for example, two sheets of ALTiC or the like, and the substrates 31 and 32 are bonded with each other.

In this case, as shown in FIG. 6, servo signal reproducing magnetic head elements GS 1 and GS 2 for reading a servo signal from the two servo bands SB disposed with one data band DB in between, as shown in for example FIG. 1 are disposed at the both ends of one substrate 31, for example, and data recording and reproducing magnetic head elements GD (GD1, GD2, . . . ) that record in and reproduce from respective data tracks are formed and arranged at opposing positions of both the substrates 31 and 32.

The servo signal reproducing magnetic head elements GS 1 and GS 2 can be formed of reproducing magnetic head elements made of, for example, an MR (magnetic resistance) element, and the data recording and reproducing magnetic head elements GD can be composed by laminating the reproducing magnetic head element MR made of, for example, the MR element and an electromagnetic induction type thin film magnetic head element TF.

Then, on the portions where the magnetic head elements are arranged, a protective substrate made of, for example, ALTiC substrate is disposed to constitute the magnetic head element chip portion 3.

Figure 7:
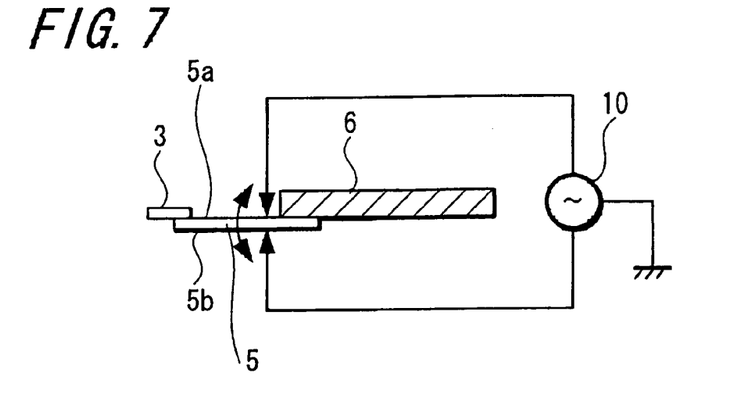
FIG. 7 is a schematic constitutional diagram of a relevant part of an example of the linear-type tape storage magnetic head device according to the present invention.

The fine-move tracking mechanism 5 is, as shown for example in FIG. 7, formed of a piezoelectric element made of a piezoelectric ceramic plate, with one end thereof fixed to a base substrate 2, and the magnetic head element chip portion 3 is disposed at the free end thereof. Then, a servo signal voltage from a signal voltage source 10 corresponding to a tracking servo signal obtained from the servo signal reproducing magnetic head element is applied between electrode layers 5a and 5b formed on both surfaces of the piezoelectric element to bent the piezoelectric element by extension of one surface and compression of other surface in the opposite direction of the piezoelectric element, so that the data recording and reproducing magnetic head element of the magnetic head element chip portion 3 disposed at the tip of the piezoelectric element performs tracking control of the respective data tracks.

Figure 8:
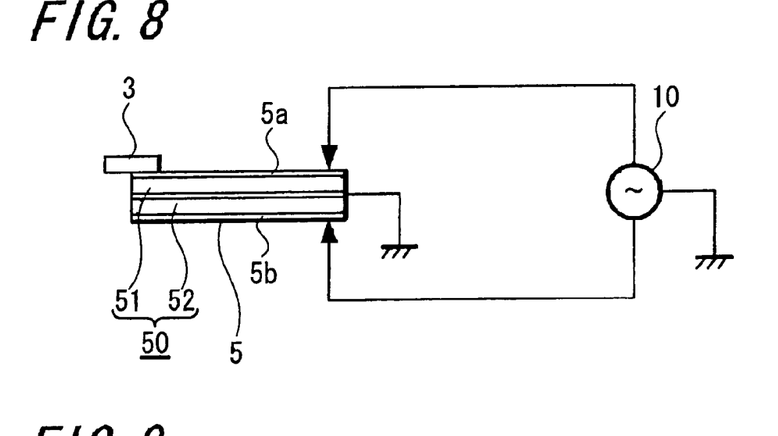
FIG. 8 is a schematic constitutional diagram of a relevant part of another example of the linear-type tape storage magnetic head device according to the present invention.

Further, as shown in FIG. 8, two sheets of piezoelectric ceramic plates 51 and 52 are placed on top of each other to form a bimorph 50 and then, a signal voltage corresponding to tracking servo signals having different polarities to each other on both of the outside electrodes 5a and 5b is applied to a common electrode 5c provided in the center to bend both the ceramic substrates 51 and 52, so that the magnetic head element chip portion 3 disposed at the tip thereof performs tracking control as the chip fine-moves according to a servo signal. In FIG. 8, the same symbols are given to the portions corresponding to those in FIG. 7 and redundant explanations will be omitted.

Figure 9:
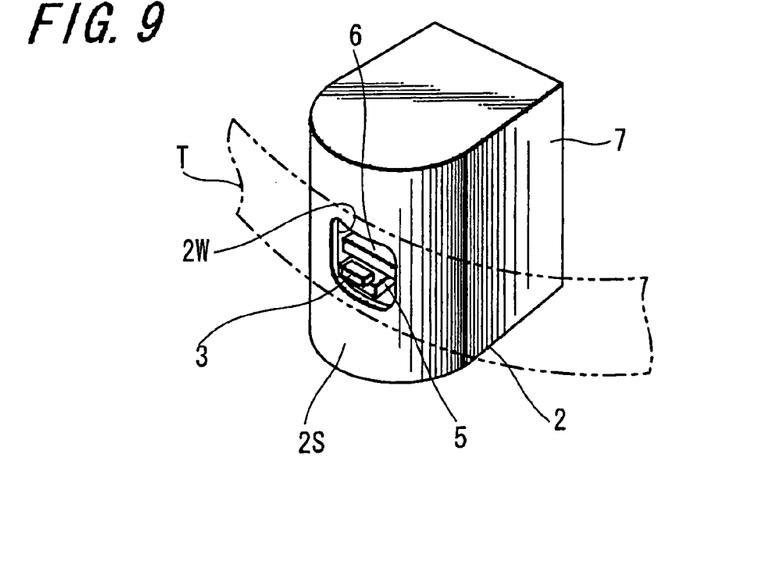
FIG. 9 is a perspective view of an example of the linear-type tape storage magnetic head device according to the present invention.

On the other hand, as shown in for example FIG. 9, a guide block 7 constituting the sliding portion 2 is formed. This guide block 7 can be composed of a shield case in which the sliding surface 2S having a cylinder surface shape in contact with the magnetic tape T is formed in the front part. An opening 2W is bored in the front part forming the sliding surface 2S. The magnetic head element chip portion 3 is disposed in the rear portion of the guide block 7, that is, inside thereof, and the respective head elements GS, GD are projected toward the magnetic tape T through the opening 2W so that all the magnetic head elements are made to slide in contact with the magnetic tape T. Specifically, all the magnetic head elements are arranged in the same sliding surface in contact with the magnetic tape T.

Then, movement of the magnetic head elements GS and GD due to the movement of the magnetic head element chip portion 3 according to the control of the fine-move tracking mechanism 5 is performed inside the opening 2W.

Further, as shown in for example FIG. 5, a base 6 and the sliding portion 2, that is, the guide block 7 of the fine-move tracking mechanism 5 having the magnetic head element chip portion 3 is made to rough-move in the width direction of the magnetic tape T according to the rough-move tracking mechanism 4.

The rough-move tracking mechanism 4 is provided with a screw rod 9 that revolves according to a drive-motor 8 such as, for example, a step motor or the like and is provided with a moving body 9 screws into the screw rod 9, to which the guide block 7 and the base 6 of the fine-move tracking mechanism 5 are attached. In this case, the screw rod 9 is disposed in the width direction of the magnetic tape T, and the moving body 9 is moved in the axial direction in accordance with the revolution of the screw rod 9 by means of the drive motor 8. In this manner, the moving body 9 is moved to a predetermined position by the revolution of the screw rod driven by the drive motor 8 to move the magnetic head element chip portion 3 in the width direction of the magnetic tape T, so that each of the data recording and reproducing magnetic head elements GD faces a required data track of a required data band of the magnetic tape T.

As heretofore described, in the present invention the lightweight portion of the magnetic head element chip portion 3 performs tracking control in accordance with the control by the fine-move tracking mechanism 5. As a result, the high-speed operation of the tracking control can be obtained.

In other words, the respective recording and reproducing magnetic head elements GD in the magnetic head element chip portion 3 are specifically, for example, approximately 1 mm to 2 mm in thickness, and since the vertical and horizontal size thereof can be made several mm or so, compared with the tracking servo, which was mentioned above as the case of the magnetic head structure selected to be two times the length of the magnetic tape T, a reduction in size of the tracking servo as well as a high-speed drive of the tracking servo can be obtained.

In addition, in the case where the fine-move tracking mechanism 5 is composed of the piezoelectric plate, a extremely high-speed operation becomes possible, when compared with VCM mentioned above.

Figure 10:
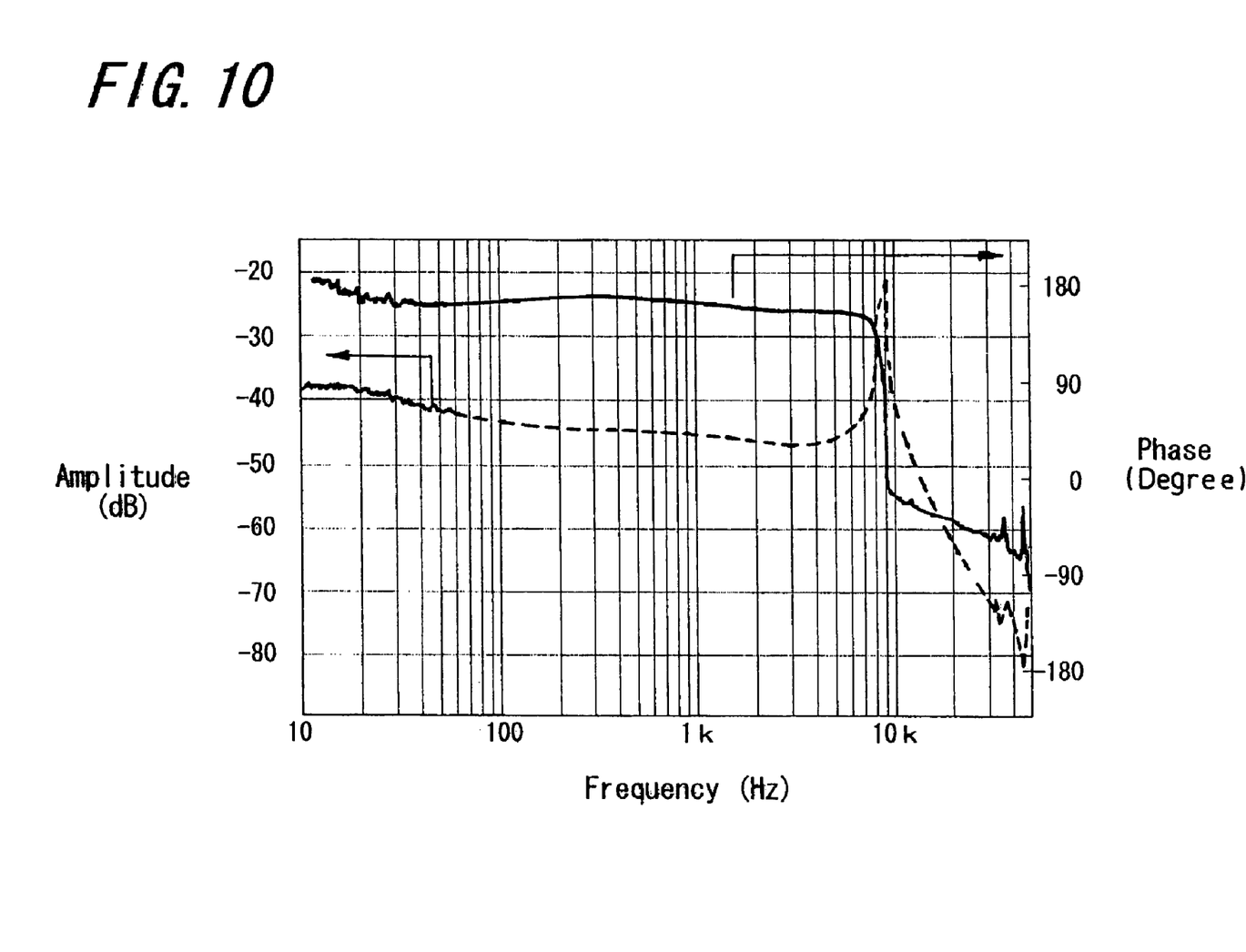
FIG. 10 is a measurement curve of the frequency response characteristics of a tracking head according to the present invention.

The resonance frequency of the magnetic head element chip portion 3 (called a dynamic tracking head) including the bimorph fine-move tracking mechanism 5 is 500 Hz or more. A dashed line and a solid line in FIG. 10 respectively show the results of measurement of the frequency characteristics of, the amplitude and phase of the dynamic tracking head. In this case, the length of the bimorph is 3 mm, and the frequency characteristics of the amplitude and phase remain flat up to a high range (5 kHz or more) and can greatly be made larger compared with that of conventional several hundreds Hz.

With a tape speed of approximately 10 m/s or so, performance capable of realizing a servo band of 1 kHz or so that is considered to be necessary to realize 2k to 5k TPI can be obtained.

Although the fine-move tracking mechanism 5 using the piezoelectric element is capable of performing a high-speed operation, its tracking range is several 10 μm.

On the other hand, the width of the magnetic tape is, for example, 8 mm to 12.7 mm or more. In the present invention, since the data recording and reproducing magnetic head element can be brought correspondingly to all the data tracks by the rough-move tracking mechanism 4, and in the state of a magnetic head element is brought correspondingly to all the data tracks, tracking servo with respect to the respective tracks can be performed by the fine-move tracking mechanism 5.

Since the magnetic head device according to the present invention has a two-stage tracking configuration, in which rough-adjustments are performed by the rough-move tracking mechanism 5 so that a magnetic head is brought to a target data track of a target data band and tracking servo by the fine-move tracking mechanism is capable of performing on the light weight portion of the magnetic head element chip portion, a mechanical load on the fine-move tracking mechanism can be extremely reduced compared with conventional ones. As a result, the tracking using the servo signal is improved, high-speed tracking can be performed and also accurate tracking can be performed.

It should be noted that, it is needless to say that the present invention is not limited to the embodiments and is capable of employing various configurations in which, for example, the rough-move tracking mechanism 4 can be composed of VCM.

Having described preferred embodiments of the present invention with reference to the accompanying drawings, it is to be understood that the present invention is not limited to the embodiments and that various changes and modifications can be effected therein by one skilled in the art without departing from the spirit or scope of the present invention as defined in the appended claims.

What is claimed is:

1. A linear-type tape storage magnetic head device that is a magnetic head device used for a linear-lype magnetic tape storage including a tracking mechanicsm, wherein
    a magnetic head portion comprises a sliding poition constituting a main sliding surface in contact with said magnetic tape and a magnetic head element chip portion having a servo signal reproducing magnetic head element for reading a servo signal, a data recording magnetic head element for writing data, and data reproducing magnetic head element for reading data;
    said tracking mechanism is a two-stage tracking mechanism including a rough-move tracking mechanism and fine-move tracking mechanism;
    said magnetic head element chip portion is connected directly to said fine-move tracking mechanism;
    said fine-move tracking mechanism is connected to said rough-move tracking mechanism; and
    said rough-move tracking mechanism moves said magnetic head element chip portion and said fine-move tracking mechanism across a plurality of tracks on said tape in order to provide for selection of a track; and
    said fine-move tracking mechanism moves only said magnetic head element chip portion within an opening of a magnetic head assembly guide block to effect fine-move tracking for the selected track.

2. The linear-type tape storage magnetic bead device according to claim 1, wherein
    said tine-move tracking mechanism is driven by a servo signal recorded on said magnetic tape from said servo signal reproducing magnetic head element and makes said magnetic head element chip portion fine-move in the width direction of said magnetic tape to obtain a high-speed tracking.

3. The linear-type tape storage magnetic head device according to claim 1, wherein
    said fine-move tracking mechanism has a resonance frequency of 500 Hz or more.

4. The linear-type tape storage magnetic head device according to claim 1, wherein
 said fine-move tracking mechanism is formed of a bimorph element including a pair of piezoelectric ceramic plates; and
 a voltage is applied to said bimorph element corresponding to a servo signal from said magnetic head element for reading servo signal, which makes said magnetic head element chip portion fine-move in the width direction of said magnetic tape to obtain a high-speed tracking.

5. The linear-type tape storage magnetic head device according to claim 1; wherein
 a magnetic tape traveling guide block constituting a sliding portion in contact with said magnetic tape is provided;
 an opening is formed in the sliding surface of said magnetic tape traveling guide block in contact with said magnetic tape;
 said magnetic head element chip portion is disposed in the rear portion of said magnetic tape traveling guide block, with a magnetic gap being made to face said sliding surface through said opening; and
 the movement of said magnetic head element chip portion at least by said fine-move mechanism alone is constrained to the inside of the said opening.

6. The linear-type tape storage magnetic head device according to claim 1, wherein said rough-move tracking mechanism comprises a drive motor that drives a screw rod.

7. The linear-type tape storage magnetic head device according to claim 1, wherein said rough-move tracking mechanism comprises a drive motor that drives a screw rod.

8. The linear-type tape storage magnetic head device according to claim 1, wherein each of said servo signal reproducing magnetic head element, data recording magnetic head element, and data reproducing magnetic head element are rigidly connected to a same magnetic head element chip portion such that the fine-move tracking mechanism cause each of the servo signal reproducing magnetic head element, data recording magnetic head element, and data reproducing magnetic head element to move substantially the same amount in substantially the same direction.

9. The linear-type tape storage magnetic head device according to claim 1, wherein said fine-move tracking mechanism comprises a piezoelectric ceramic plate, such that said magnetic head element chip portion is connected to one end portion of the ceramic plate, and the opposing end portion of the ceramic plate is directly or indirectly connected to said rough-move tracking mechanism.

* * * * *